US005763130A

United States Patent [19]

Sasaki et al.

[11] Patent Number: 5,763,130

[45] **Date of Patent: *Jun. 9, 1998**

[54] ENCAPSULATED TONER FOR HEAT-AND-PRESSURE FIXING AND METHOD FOR PRODUCTION THEREOF

[75] Inventors: Mitsuhiro Sasaki; Tetsuya Asano; Kuniyasu Kawabe; Hiroyuki Kawaji, all of Wakayama; Kazuhiro Fujiki, Joetsu, all of Japan

[73] Assignee: Kao Corporation, Tokyo, Japan

[ * ] Notice: The term of this patent shall not extend beyond the expiration date of Pat. No. 5,567,567.

[21] Appl. No.: 595,211

[22] Filed: Feb. 1, 1996

Related U.S. Application Data

[62] Division of Ser. No. 450,007, May 25, 1995, Pat. No. 5,529,876, which is a continuation of Ser. No. 110,965, Aug. 24, 1993, abandoned.

[30] Foreign Application Priority Data

| | | | |
|---|---|---|---|
| Sep. 1, 1992 | [JP] | Japan | 4-259088 |
| Mar. 10, 1993 | [JP] | Japan | 5-077709 |
| Mar. 16, 1993 | [JP] | Japan | 5-082611 |

[51] Int. Cl.$^6$ .............................. G03G 9/08; C08K 3/00; C08L 67/00

[52] U.S. Cl. .......................... 430/109; 430/111; 523/512; 523/514; 525/902

[58] Field of Search .................................... 430/109, 111, 430/138; 523/512, 514; 524/460; 525/902

[56] References Cited

U.S. PATENT DOCUMENTS

| | | | |
|---|---|---|---|
| 4,016,099 | 4/1977 | Wellman et al. | 430/137 |
| 4,407,922 | 10/1983 | Grushkin et al. | 430/109 X |
| 4,814,249 | 3/1989 | Oseto et al. | 430/109 |
| 5,035,970 | 7/1991 | Hsieh et al. | 430/109 |
| 5,153,093 | 10/1992 | Sacripante et al. | 430/138 |
| 5,264,315 | 11/1993 | Tan et al. | 430/137 X |
| 5,428,435 | 6/1995 | Yasuda et al. | 430/109 X |
| 5,567,567 | 10/1996 | Akiyama et al. | 430/138 |

FOREIGN PATENT DOCUMENTS

| | | |
|---|---|---|
| 0 533172 | 3/1993 | European Pat. Off. . |
| 0 536651 | 4/1993 | European Pat. Off. . |
| 0 552785 | 7/1993 | European Pat. Off. . |
| 59-61843 | 4/1984 | Japan . |
| 63-128360 | 5/1988 | Japan . |
| 63-128361 | 5/1988 | Japan . |
| 63-281168 | 11/1988 | Japan . |
| 1-185652 | 7/1989 | Japan . |
| 2-162355 | 6/1990 | Japan . |
| 4-184358 | 7/1992 | Japan . |
| 4-287051 | 10/1992 | Japan . |
| 5-197203 | 8/1993 | Japan . |
| 2 250103 | 5/1992 | United Kingdom . |

*Primary Examiner*—Bernard P. Codd
*Attorney, Agent, or Firm*—Birch, Stewart, Kolasch & Birch, LLP

[57] ABSTRACT

The present invention is directed to an encapsulated toner for heat-and-pressure fixing having a heat-fusible core material containing at least a thermoplastic resin and a coloring agent and a shell formed thereon so as to cover the surface of the core material. An amorphous polyester is used as the main component of the shell, and the amount of the amorphous polyester is normally 3 to 50 parts by weight, based on 100 parts by weight of the core material. The encapsulated toner of the present invention is excellent in offset resistance, fixable even at a low temperature and excellent in blocking resistance when it is used for heat-and-pressure fixing using a heat roller.

9 Claims, No Drawings

ENCAPSULATED TONER FOR HEAT-AND-PRESSURE FIXING AND METHOD FOR PRODUCTION THEREOF

This application is a divisional of application Ser. No. 08/450,007, filed on May 25, 1995, now U.S. Pat. No. 5,529,876, which is a continuation of abandoned application Ser. No. 08/110,965, filed on Aug. 24, 1993, now abandoned the entire contents of which are hereby incorporated by reference.

BACKGROUND OF THE INVENTION

1. Field of the Invention

The present invention relates to an encapsulated toner for heat-and-pressure fixing used for development of electrostatic latent images in an electrophotography, an electrostatic printing, or an electrostatic recording, and to a method for production of such an encapsulated toner.

2. Discussion of the Related Art.

As described in U.S. Pat. Nos. 2,297,691 and 2,357,809 and other publications, the conventional electrophotography comprises the steps of forming an electrostatic latent image by evenly charging a photoconductive insulating layer and subsequently exposing the layer to eliminate the charge on the exposed portion and visualizing the formed image by adhering colored charged fine powder known as a toner to the latent image (a developing process); transferring the obtained visible image to an image-receiving sheet such as a transfer paper (a transfer process); and permanently fixing the transferred image by heating, pressure application or other appropriate means of fixing (a fixing process).

As stated above, a toner must meet the requirements not only in the development process but also in the transfer process and fixing process.

Generally, a toner undergoes mechanical frictional forces due to shear force and impact force during the mechanical operation in a developer device, thereby deteriorating after copying from several thousands to several ten thousands of sheets. Such deterioration of the toner can be prevented by using a tough resin having such a high molecular weight that it can withstand the above mechanical friction. However, this kind of a resin generally has such a high softening point that the resulting toner cannot be sufficiently fixed by a non-contact method such as oven fixing or radiant fixing with infrared rays, because of its poor thermal efficiency. Further, when the toner is fixed by a contact fixing method such as a heat-and-pressure fixing method using a heat roller, which is excellent in thermal efficiency and therefore widely used, it becomes necessary to raise the temperature of the heat roller in order to achieve sufficient fixing of the toner, which brings about such disadvantages as a deterioration of the fixing device, a curling of paper and an increase in energy consumption. Furthermore, the resin described above is poor in grindability, thereby remarkably lowering the production efficiency of the toner upon the production of the toner. Accordingly, the binding resin having an increased degree of polymerization and also too high a softening point cannot be used.

Meanwhile, according to the heat-and-pressure fixing method using a heat roller, the surface of a heat roller contacts the surface of a visible image formed on an image-receiving sheet under pressure, so that the thermal efficiency is excellent and therefore widely used in various copying machines from high-speed ones to low-speed ones. However, when the surface of a heat roller contacts the surface of the visible image, the toner is likely to cause a so-called "offset phenomenon," wherein the toner is adhered to the surface of the heat roller, and thus transferred to a subsequent transfer paper. In order to prevent this phenomenon, the surface of a heat roller is coated with a material excellent in release properties, such as a fluororesin, and further a releasing agent such as silicone oil is applied thereon. However, the method of applying a silicone oil, necessitates a larger-scale fixing device, which is not only expensive but also complicated, which in turn may undesirably become causative of various problems.

Although processes for improving the offset phenomenon by unsymmetrizing or crosslinking the resins have been disclosed in Japanese Patent Examined Publication No. 493/1982 and Japanese Patent Laid-Open Nos. 44836/1975 and 37353/1982, the fixing temperature has not yet been improved by these processes.

Since the lowest fixing.temperature of a toner is generally between the temperature of low-temperature offsetting of the toner and the temperature of the high-temperature offsetting thereof, the serviceable temperature range of the toner is from the lowest fixing temperature to the temperature for high-temperature offsetting. Accordingly, by lowering the lowest fixing temperature as much as possible and raising the temperature causing high-temperature offsetting as much as possible, the serviceable fixing temperature can be lowered and the serviceable temperature range can be widened, which enables energy saving, high-speed fixing and prevention of curling of paper.

From the above reasons, the development of a toner excellent in fixing ability and offset resistance has always been desired.

There has been proposed a method for achieving the low-temperature fixing by using an encapsulated toner comprising a core material and a shell formed thereon so as to cover the surface of the core material.

Among such toners, those having a core material made of a low-melting wax which is easily plastically deformable, as described in U.S. Pat. No. 3,269,626, Japanese Patent Examined Publication Nos. 15876/1971 and 9880/1969, and Japanese Patent Laid-Open Nos. 75032/1973 and 75033/1973, are poor in fixing strength and therefore can be used only in limited fields, although they can be fixed only by pressure.

Further, with respect to toners having a liquid core material, when the strength of the shell is low, the toners tend to break in the developing device and stain the inside thereof, though they can be fixed only by pressure. On the other hand, when the strength of the shell is high, a higher pressure is necessitated in order to break the capsule, thereby giving too glossy images. Thus, it has been difficult to control the strength of the shell.

Further, there has been proposed, as a toner for heat-and-pressure fixing, an encapsulated toner for heat roller fixing which comprises a core material made of a resin having a low glass transition temperature which serves to enhance the fixing strength, though blocking at a high temperature may take place if used alone, and a shell of a high-melting point resin wall which is formed by interfacial polymerization for the purpose of imparting blocking resistance to the toner. However, in Japanese Patent Laid-Open No. 56352/1986, this toner cannot fully exhibit the performance of the core material, because the melting point of the shell material is too high and also the shell is too tough and not easily breakable. On the same line of thinking as that described above, encapsulated toners for heat roller fixing with an improved fixing strength of the core material have been proposed (see Japanese Patent Laid-Open Nos. 205162/

1983, 205163/1983, 128357/1988, 128358/1988, 128359/1988, 128360/1988, 128361/1988 and 128362/1988). However, since these toners are prepared by a spray drying method, a higher load to the equipments for the production thereof becomes necessary. In addition, they cannot fully exhibit the performance of the core material, because they have not come up with a solution for the problems in the shell.

Further, in the encapsulated toner proposed in Japanese Patent Laid-Open No. 281168/1988, the shell is made of a thermotropic liquid crystal polyester, and in the encapsulated toner proposed in Japanese Patent Laid-Open No. 184358/1992, a crystalline polyester is used. Since each of the polyesters used in these references is not amorphous, the resin sharply melts. However, the amount of energy required for fusion is large. Further, Tg of the core material is also high, thereby making the fixing ability of the resulting toner poor.

Also, as for methods for encapsulation proposed in Japanese Patent Laid-Open No. 128357/1988, there are mentioned such methods as an immersion method using a solvent, a spray-drying method and a fluidizing bed method, all of which have problems in that they require complicated operations.

Further, there has been attempted to control the chargeability of the encapsulated toner in the presence of a charge control agent in the shell of the encapsulated toner or on the surface of the encapsulated toner. However, in the developing process, the charge control agent becomes detached from the toner due to friction with carrier to adhere onto the carrier, and the triboelectric charge of the resulting toner is lowered, thereby causing such problems as background contamination and scattering of the toner in the developer device. In addition, when no charge control agents are present on the surface of the toner, charging speed may become slow depending upon the type of carriers, thereby causing background contamination, or scattering of the toner in the case of quick printing.

SUMMARY OF THE INVENTION

An object of the present invention is to provide an encapsulated toner for heat-and-pressure fixing which is excellent in offset resistance, fixable even at a low temperature and excellent in blocking resistance when the encapsulated toner is used for heat-and-pressure fixing using a heat roller.

Another object of the present invention is to provide a method for production of such an encapsulated toner.

Therefore, as a result of intensive research in view of solving the above-mentioned problems, the present inventors have found that an encapsulated toner for heat-and-pressure fixing can stably form clear visible images free from background contamination f or a large number of copying by using an amorphous polyester resin as the main component of the shell of the encapsulated toner, and have thus developed the present invention.

More particularly, the present invention essentially relates to:

(1) An encapsulated toner for heat-and-pressure fixing comprising a heat-fusible core material containing at least a thermoplastic resin and a coloring agent and a shell formed thereon so as to cover the surface of the core material, wherein the shell comprises an amorphous polyester as the main component, and the amount of the amorphous polyester is 3 to 50 parts by weight, based on 100 parts by weight of the core material;

(2) The encapsulated toner for heat-and-pressure fixing described in (1) above, wherein the shell comprises at least an amorphous polyester and a copolymer having one or more acid anhydride groups;

(3) An encapsulated toner for heat-and-pressure fixing comprising a heat-fusible core material containing at least a thermoplastic resin and a coloring agent and a shell formed thereon so as to cover the surface of the core material, wherein the shell comprises at least an amorphous polyester having tertiary amine groups; and (4) A method for producing an encapsulated toner for heat-and-pressure fixing comprising a heat-fusible core material containing at least a thermoplastic resin and a coloring agent and a shell formed thereon so as to cover the surface of the core material, the method having the step of forming a shell by coating the surface of the core material with an amorphous polyester as a shell component by the in situ polymerization method.

DETAILED DESCRIPTION OF THE INVENTION

The encapsulated toner of the present invention is characterized in that the shell comprises an amorphous polyester as the main component. The main component of the shell mentioned herein means that the amorphous polyester is an essential component in the shell-forming material, including a case where the shell-forming material consists of the amorphous polyester alone.

The amorphous polyester used in the present invention can generally be obtained by a condensation polymerization between at least one alcohol monomer selected from the group consisting of dihydric alcohol monomers and trihydric or higher polyhydric alcohol monomers and at least one carboxylic acid monomer selected from the group consisting of dicarboxylic acid monomers and tricarboxylic or higher polycarboxylic acid monomers. Among them, the amorphous polyesters obtained by the condensation polymerization of monomers containing a dihydric alcohol monomer and a dicarboxylic acid monomer, and further at least a trihydric or higher polyhydric alcohol monomer and/or a tricarboxylic or higher polycarboxylic acid monomer are suitably used.

Examples of the dihydric alcohol components include bisphenol A alkylene oxide adducts such as polyoxypropylene(2.2)-2,2-bis(4-hydroxyphenyl)propane, polyoxypropylene(3.3)-2,2-bis(4-hydroxyphenyl)propane, polyoxyethylene(2.2)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane; ethylene glycol, diethylene glycol, triethylene glycol, 1,2-propylene glycol, 1,4-butanediol, neopentyl glycol, 1,6-hexanediol, 1,4-cyclohexanedimethanol, dipropylene glycol, polyethylene glycol, polypropylene glycol, hydrogenated bisphenol A and other dihydric alcohols.

Examples of the trihydric or higher polyhydric alcohol components include sorbitol, 1,2,3,6-hexanetetrol, 1,4-sorbitan, pentaerythritol, 1,2,4-butanetriol, glycerol, 2-methylpropanetriol, trimethylolethane, trimethylolpropane, 1,3,5-trihydroxymethylbenzene, and other trihydric or higher polyhydric alcohols. Among them, the trihydric alcohols are preferably used.

In the present invention, these dihydric alcohol monomers and trihydric or higher polyhydric alcohol monomers may be used singly or in combination.

As for the acid components, examples of the dicarboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, n-dodecylsuccinic acid, n-octylsuccinic acid, isooctenylsuccinic acid, isooctylsuccinic acid, and acid anhydrides thereof, lower alkyl esters thereof and other dicarboxylic acids.

Examples of the tricarboxylic or higher polycarboxylic acid components include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, and pyromellitic acid and acid anhydrides thereof, lower alkyl esters thereof and other tricarboxylic or higher polycarboxylic acids.

In the present invention, among these carboxylic acid components, a preference is given to the tricarboxylic acids or the derivatives thereof. These dicarboxylic acid monomers and tricarboxylic or higher polycarboxylic acid monomers may be used singly or in combination.

The method for producing an amorphous polyester in the present invention is not particularly limitative, and the amorphous polyester can be produced by esterification or transesterification of the above monomers.

Here, "amorphous" is referred to those which do not have a definite melting point. When a crystalline polyester is used in the present invention, the amount of energy required for fusion is large, thereby making the fixing ability of the toner undesirably poor.

In the amorphous polyester thus obtained, the glass transition temperature is normally 50° to 80° C., preferably 55° to 70° C. When the glass transition temperature is less than 50° C., the storage stability of the toner becomes poor, and when it exceeds 80° C., the fixing ability of the resulting toner becomes undesirably poor. In the present invention, the "glass transition temperature" used herein refers to the temperature of an intersection of the extension of the baseline of not more than the glass transition temperature and the tangential line showing the maximum inclination between the kickoff of the peak and the top thereof as determined using a differential scanning calorimeter ("DSC Model 200," manufactured by Seiko Instruments, Inc.), at a temperature rise rate of 10° C./min.

Also, the acid value of the above amorphous polyester is preferably 3 to 50 KOH#mg/g, more preferably 10 to 30 KOH#mg/g. When it is less than 3 KOH mg/g, the shell comprising the amorphous polyester is less likely to be formed on the core material during the in situ polymerization, thereby making the storage stability of the toner poor, and when it exceeds 50 KOH#mg/g, the polyester is likely to shift to a water phase, thereby making the production stability poor. Here, the acid value was measured according to JIS K0070.

The encapsulated toner of the present invention contains the above amorphous polyester as its main component in the shell materials, and as other materials constituting the shell, a copolymer having one or more acid anhydride groups, a polyamide, a polyester-amide, a polyurea, and a polyurethane can be used.

Examples of the copolymers having one or more acid anhydride groups used in the present invention include a copolymer obtained by copolymerizing an α,β-ethylenic copolymerizable monomer (A) having an acid anhydride group and the other α,β-ethylenic copolymerizable monomer (B).

Here, examples of the α,β-ethylenic copolymerizable monomers (A) having an acid anhydride group include itaconic anhydride, crotonic anhydride, and the compounds represented by the following formula:

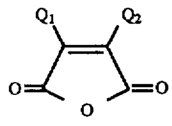

wherein $Q_1$ and $Q_2$ independently represents a hydrogen atom, an alkyl group having 1 to 3 carbon atoms or a halogen atom, which may be exemplified by maleic anhydride, citraconic anhydride, 2,3-dimethylmaleic anhydride, chloromaleic anhydride, and bromomaleic anhydride, with a preference given to maleic anhydride and citraconic anhydride.

Examples of other α,β-ethylenic copolymerizable monomers (B) include styrene and styrene derivatives such as styrene, o-methylstyrene, m-methylstyrene, p-methylstyrene, α-methylstyrene, p-chlorostyrene and vinylnaphthalene; ethylenic unsaturated monoolefins such as ethylene, propylene, and isobutylene; vinyl esters such as vinyl chloride, and vinyl acetate; ethylenic monocarboxylic acids and esters thereof such as acrylic acid, methyl acrylate, ethyl acrylate, n-propyl acrylate, isopropyl acrylate, n-butyl acrylate, isobutyl acrylate, n-octyl acrylate, isooctyl acrylate, decyl acrylate, lauryl acrylate, 2-ethylhexyl acrylate, stearyl acrylate, 2-hydroxyethyl acrylate, glycidyl acrylate, phenyl acrylate, methacrylic acid, methyl methacrylate, ethyl methacrylate, n-propyl methacrylate, isopropyl methacrylate, n-butyl methacrylate, isobutyl methacrylate, n-octyl methacrylate, isooctyl methacrylate, decyl methacrylate, lauryl methacrylate, 2-ethylhexyl methacrylate, stearyl methacrylate, 2-hydroxyethyl methacrylate, glycidyl methacrylate and phenyl methacrylate; substituted monomers with ethylenic monocarboxylic acids such as acrylonitrile, methacrylonitrile and acrylamide; ethylenic dicarboxylic acids and substituted monomers therewith such as dimethyl maleate. Among these monomers, a preference is given to styrene and (meth) acrylate from the viewpoint of high reactivity.

Preferred examples of such copolymers include a copolymer obtained by copolymerizing maleic anhydride and styrene, a copolymer obtained by copolymerizing maleic anhydride, styrene and (meth)acrylate, a copolymer obtained by copolymerizing citraconic anhydride and styrene, a copolymer obtained by copolymerizing citraconic anhydride, styrene and (meth)acrylate, a copolymer obtained by copolymerizing styrene and acrylonitrile, and a copolymer obtained by copolymerizing styrene, (meth) acrylate and acrylonitrile.

The copolymer used in the present invention can be obtained by a copolymerization reaction between 5 to 95 parts by weight of the α,β-ethylenic copolymerizable monomer (A) having an acid anhydride group described above and 95 to 5 parts by weight of other α,β-ethylenic copolymerizable monomer (B). The copolymerization reaction can be carried out by conventional addition polymerizations, but it is not limitative to these methods. Also, with respect to each of the monomers (A) and (B) described above, two or more kinds of them may be used to produce a copolymer.

Also, the glass transition temperature of this copolymer is preferably not less than 60° C., more preferably not less than 80° C.

The above copolymer may be used alone or in a combination of two or more kinds.

In the present invention, the copolymer having one or more acid anhydride groups described above is used together with the above-mentioned amorphous polyester. In this case, the content of the copolymer is desirably 2 to 10% by weight, based on the amorphous polyester.

As described above, by using the copolymer having one or more acid anhydride groups as a component of the shell in addition to the amorphous polyester, it has such advantages that the triboelectric charge of the toner can be freely controlled, and that the distribution of the triboelectric charge becomes sharp.

In the present invention, the amorphous polyester described above can be used as the main component of the shell whose content is normally 50 to 100% by weight, based on the total weight of the shell. Here, other components such as polyamides, polyester-amides, polyurethanes and polyureas, may be contained in the shell in an amount of 0 to 50% by weight.

In the case of producing the encapsulated toner of the present invention by the in situ polymerization method, since each component used for shell materials such as amorphous polyester is to be dissolved in the monomers of the resin constituting the core material, the solubility to the monomers becomes necessary.

As described above, by using the amorphous polyester as the main component of the shell and further using the copolymer having one or more acid anhydride groups therewith, the detachment of the charge control agent from the toner due to friction with the carrier is unlikely to take place, thereby making it possible to stably form clear images free from background contamination for a large number of copying. Also, the blocking resistance can be improved while maintaining a good low-temperature fixing ability.

The encapsulated toner of the present invention described above is normally a toner with a negative charge since the amorphous polyester used as the main component of the shell is normally negatively charged. However, in another embodiment of the present invention, it is also possible to provide a toner with a positive charge by using a specific amorphous polyester having a positive charge as the main component of the shell. Specifically, as the amorphous polyesters with a positive charge, those having tertiary amine groups can be used. In this case, other materials constituting the shell, for example, the amorphous polyesters which do not have tertiary amine groups, or the copolymers having one or more acid anhydride groups such as the styrene/maleic anhydride copolymer described above may be used for the purpose of controlling the tribo electric charge. Besides, a small amount of polyamides, polyester-amides, polyurethanes or polyureas can be also used together therewith.

More precisely, in the present invention, there are two embodiments as to the amorphous polyesters: One has no tertiary amine groups as described above in detail, and the other has tertiary amine groups as described in detail below.

In the present invention, the amorphous polyester having tertiary amine groups is obtained by a condensation polymerization of a monomer mixture containing a dihydric or higher polyhydric alcohol monomer having one or more tertiary amine groups and/or a dicarboxylic or higher polycarboxylic acid monomer having one or more tertiary amine groups as monomers having an essential tertiary amine group. In the present invention, the condensation polymerization is preferably carried out by using the monomer having one or more tertiary amine groups in an amount of 1 to 30 mol %, based on the entire monomers, and a dihydric or higher polyhydric alcohol monomer having no tertiary amine groups and/or a dicarboxylic or higher polycarboxylic acid monomer having no tertiary amine groups in an amount of 99 to 70 mol %, based on the entire monomers. When the amount of the monomer having one or more tertiary amine groups used is less than 1 mol %, based on the entire monomers, sufficient effects of positively charging the polyester, which is generally negatively charged, cannot be obtained, and when it exceeds 30 mol %, the moisture-resistant property of the toner becomes poor.

Incidentally, although the component having a primary or secondary amine group has little effects in making the tribo electric charge positive since an amide is formed more easily during the condensation polymerization reaction, a small amount of such component may be contained in the monomer mixture.

In the present invention, the carboxylic acid monomer is generally referred to those monomers of carboxylic acids, anhydrides thereof and lower alkyl esters thereof. Here, the lower alkyl esters are those having alkyl group of 1 to 4 carbon atoms.

Examples of the monomers having one or more tertiary amine groups which can be used in the present invention include one or more kinds selected from the group consisting of dihydric or higher polyhydric alcohol monomers and dicarboxylic acid or higher polycarboxylic acid monomers having the chemical structures represented by the following general formulas (I) to (III) in the molecule, and the dihydric or higher polyhydric alcohol monomers represented by the general formula (IV).

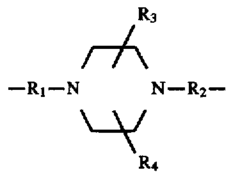

(I)

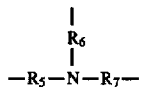

(II)

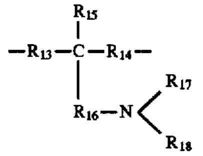

(III)

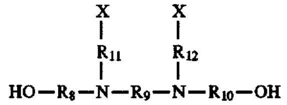

(IV)

Here, $R_1$, $R_2$, $R_5$, $R_7$, $R_8$, $R_9$, $R_{10}$, $R_{11}$, $R_{12}$, $R_{13}$, $R_{14}$ and $R_{16}$ independently represent an alkylene group of 1 to 15 carbon atoms; $R_3$ and $R_4$ independently represent an alkyl group of 1 to 10 carbon atoms; $R_6$ represents an alkyl group or alkylene group of 1 to 10 carbon atoms; $R_{15}$ represents an alkyl group of 1 to 3 carbon atoms or the following group;

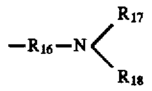

$R_{17}$ and $R_{18}$ independently represent an alkyl group of 1 to 4 carbon atoms, wherein $R_{17}$ and $R_{18}$ may form a heterocyclic ring with a nitrogen atom; and X represents a hydrogen atom or a hydroxyl group.

In the general formulas (I) to (IV), the alkylene groups of 1 to 15 carbon atoms represented by $R_1$, $R_2$, $R_5$, $R_7$, $R_8$, $R_9$, $R_{10}$, $R_{11}$, $R_{12}$, $R_{13}$, $R_{14}$ and $R_{16}$, which may be the same or different, include those having a linear or branched chain, an aromatic ring or a saturated alicyclic ring. The alkyl groups of 1 to 10 carbon atoms represented by $R_3$ and $R_4$, which may be the same or different, include those having a linear or branched chain. The alkyl group or alkylene group of 1 to 10 carbon atoms represented by $R_6$ include those having a linear or branched chain. The alkyl groups of 1 to 3 carbon atoms represented by $R_{15}$, include those having a linear or branched chain. The alkyl groups of 1 to 4 carbon atoms represented by $R_{17}$ and $R_{18}$, which may be the same or different, include those having a linear or branched chain, wherein $R_{17}$ and $R_{18}$ may form a heterocyclic ring with a nitrogen atom, and this is the same when $R_{15}$ is represented by:

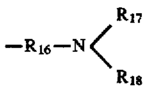

Also, X represents a hydrogen atom or a hydroxyl group.

Specifically, the compounds include those as indicated in the following (1)–(7).

(1) Examples of the glycols having the chemical structure represented by the general formula (I) include N,N'-bis(hydroxymethyl)piperazine, N,N'-bis(2-hydroxyethyl)-2,5-dimethylpiperazine, and N,N'-bis (2-hydroxy-2-methylpropyl)piperazine.

(2) Examples of the dicarboxylic acids or lower alkyl esters thereof having the chemical structure represented by the general formula (I) include N,N'-bis (carboxymethyl)piperazine, and N,N'-bis (carboxyethyl)piperazine, and the lower alkyl esters thereof.

(3) Examples of the alcohols having the chemical structure represented by the general formula (II) include N,N-bis(2-hydroxyethyl)methylamine, N,N-bis(2-hydroxyethyl)cyclohexylamine, and triethanolamine.

(4) Examples of the carboxylic acids or the lower alkyl esters thereof having the chemical structure represented by the general formula (II) include N,N-bis (carboxymethyl) methylamine, N,N-bis (2-carboxyethyl)methylamine, and nitrilotriacetic acid, and the lower alkyla esters thereof.

(5) Examples of the glycols having the chemical structure represented by the general formula (III) include 2-methyl-2-N,N-dimethylaminomethyl-1,3-propanediol, and 2-methyl-2-N,N-diethylaminomethyl-1,3-propanediol.

(6) Examples of the dicarboxylic acids or the lower alkyl esters thereof having the chemical structure represented by the general formula (III) include 4-methyl-4-N,N-dimethylaminomethyl azelaic acid, and 5-methyl-5-N, N-diethylaminoethyl undecanedioic acid, and the lower alkyl esters thereof.

(7) Examples of alcohols represented by the general formula (IV) include N,N'-dimethyl-N,N'-bis(2-hydroxyethyl)ethylenediamine, and N,N'-dibutyl-N,N'-bis(2-hydroxypropyl)-pentamethylenediamine.

In the present invention, these dihydric or higher polyhydric alcohol monomers having one or more tertiary amine groups or dicarboxylic or higher polycarboxylic acid monomers having one or more tertiary amine groups can be used singly or in a combination of two or more. A particular preference is given to N,N-bis(2-hydroxyethyl) methylamine, piperazine derivatives, triethanolamine and nitrilotriacetic acid.

In this embodiment, the same ones as those mentioned above used in the production of the ordinary amorphous polyester having no tertiary amine groups can be used for the dihydric or higher polyhydric alcohol monomers having no tertiary amine groups and the dicarboxylic or higher polycarboxylic acid monomers having no tertiary amine groups.

The method for producing an amorphous polyester having tertiary amine groups in the present invention is not particularly limitative, and the amorphous polyester can be produced by esterification or transesterification using the monomer mixtures containing the above monomers having one or more tertiary amine groups. At this time, the polymerization reaction may be carried out by mixing all of the monomer components at once at start. Alternatively, the polymerization reaction may be carried out by introducing those monomers having one or more tertiary amine groups into the reaction system during the progress of the polymerization reaction for the purpose of adjusting the content of the tertiary amine groups in the amorphous polyester.

In the amorphous polyester of the second embodiment thus obtained, the glass transition temperature is normally 50° C. to 80° C., preferably 55° C. to 70° C., as in the case of the first embodiment, i.e., the amorphous polyesters having no tertiary amine groups.

Also, the acid value of the above amorphous polyester (the second embodiment) is preferably 1 to 50 KOH#mg/g, more preferably 5 to 30 KOH#mg/g. When it is less than 1 KOH mg/g, the shell comprising the amorphous polyester is less likely to be formed on the core material during the in situ polymerization, thereby making the storage stability of the toner poor, and when it exceeds 50 KOH#mg/g, the polyester is likely to shift to a water phase, thereby making the production stability poor.

Further, the amine value of the above amorphous polyester (the second embodiment) is 2 to 25 KOH mg/g. When the amine value is less than 2 KOH mg/g, sufficient effects of positively charging the polyester cannot be obtained, and when it exceeds 25 KOH mg/g, the moisture-resistant property of the toner becomes poor. The amine value is measured according to the method according to ASTM D-2073-66.

In the present invention, the amorphous polyester having tertiary amine groups described above can be used as the main component of the shell whose content is normally 50 to 100% by weight, based on the total weight of the shell, as in the amorphous polyester in the first embodiment. Here, other components such as polyamides, polyester-amides, polyurethanes and polyureas, may be contained in the shell in an amount of 0 to 50% by weight.

The amorphous polyester of the first embodiment may be used in combination with that of the second embodiment. In such a case, there may be two cases, namely, the case where the toner is positively charged and that where the toner is negatively charged.

In the case of positively charging the toner, the amorphous polyester of the second embodiment is added in an amount of not less than 50% by weight of the total amount of the amorphous polyesters added. In the case of negatively charging the toner, the amorphous polyester of the second embodiment is added in an amount of less than 50% by weight, so that the amount of electric charge can be controlled.

The resins to be used as the main components of the heat-fusible core materials (thermoplastic core materials) for the encapsulated toner according to the present invention include thermoplastic resins such as polyester-polyamide resins, polyamide resins and vinyl resins, with a preference given to the vinyl resins. The glass transition temperatures assignable to the thermoplastic resin used as the main component of the heat-fusible core material described above are preferably 10° C. to 50° C., more preferably 20° C. to 40° C. When the glass transition temperature is less than 10° C., the storage stability of the encapsulated toner becomes poor, and when it exceeds 50° C., the fixing strength of the resulting encapsulated toner becomes undesirably poor.

Among the above-mentioned thermoplastic resins, examples of the monomers constituting the vinyl resins include styrene and its derivatives such as styrene, o-methylstyrene, m-methylstyrene, p-methylstyrene, α-methylstyrene, and vinylnaphthalene; ethylenic unsaturated monoolefins such as ethylene, propylene, butylene and isobutylene; vinyl esters such as vinyl chloride, and vinyl acetate; ethylenic monocarboxylic acids and esters thereof such as acrylic acid, methyl acrylate, ethyl acrylate, n-propyl acrylate, isopropyl acrylate, n-butyl acrylate, isobutyl acrylate, n-octyl acrylate, isooctyl acrylate, decyl acrylate, lauryl acrylate, 2-ethylhexyl acrylate, stearyl acrylate, 2-hydroxyethyl acrylate, glycidyl acrylate, phenyl acrylate, methacrylic acid, methyl methacrylate, ethyl methacrylate, n-propyl methacrylate, isopropyl methacrylate, n-butyl methacrylate, isobutyl methacrylate, n-octyl methacrylate, isooctyl methacrylate, decyl methacrylate, lauryl methacrylate, 2-ethylhexyl methacrylate, stearyl methacrylate, 2-hydroxyethyl methacrylate, glycidyl methacrylate, phenyl methacrylate, dimethylaminoethyl methacrylate and diethylaminoethyl methacrylate; substituted monomers with ethylenic monocarboxylic acids such as acrylonitrile, methacrylonitrile and acrylamide; ethylenic dicarboxylic acids and substituted monomersally therewith such as dimethyl maleate; and N-vinyl compounds such as N-vinylpyrrole and N-vinylpyrrolidone.

Among the above core material resin-constituting components according to the present invention, it is preferred that styrene or its derivatives is used in an amount of 50 to 90% by weight to form the main chain of the resins, and that the ethylenic monocarboxylic acid or esters thereof is used in an amount of 10 to 50% by weight to adjust the thermal properties such as the softening point of the resin, so that the glass transition temperature of the core material resin can be easily controlled.

When a crosslinking agent is added to the monomer composition comprising the core material-forming resin according to the present invention, any known crosslinking agents may be properly used. Examples thereof include divinylbenzene, divinylnaphthalene, polyethylene glycol dimethacrylate, diethylene glycol diacrylate, triethylene glycol diacrylate, 1,6-hexylene glycol dimethacrylate, dipropylene glycol dimethacrylate, polypropylene glycol dimethacrylate, trimethylolpropane trimethacrylate, trimethylolpropane triacrylate, and diallyl phthalate, with a preference given to divinylbenzene and polyethylene glycol dimethacrylate. These crosslinking agents may be used, if necessary, alone or in a combination of two or more.

The amount of these crosslinking agents used is 0.001 to 15% by weight, preferably 0.1 to 10% by weight, based on the polymerizable monomers. When the amount of these crosslinking agents used, is more than 15% by weight, the resulting toner is unlikely to be melted with heat, thereby resulting in poor heat fixing ability and poor heat-and-pressure fixing ability. On the contrary, when the amount used is less than 0.001% by weight, in the heat-and-pressure fixing, a part of the toner cannot be completely fixed on a paper but rather adheres to the surface of a roller, which in turn is transferred to a subsequent paper, namely an offset phenomenon takes place.

A graft or crosslinked polymer prepared by polymerizing the above monomers in the presence of an unsaturated polyester may be also used as the resin for the core material.

Examples of the polymerization initiators to be used in the production of the thermoplastic resin for the core material include azo and diazo polymerization initiators such as 2,2'-azobis(2,4-dimethylvaleronitrile), 2,2'-azobisisobutyronitrile, 1,1'-azobis(cyclohexane-1-carbonitrile) and 2,2'-azobis-4-methoxy-2,4-dimethylvaleronitrile; and peroxide polymerization initiators such as benzoyl peroxide, methyl ethyl ketone peroxide, isopropyl peroxycarbonate, cumene hydroperoxide, 2,4-dichlorobenzoyl peroxide, lauroyl peroxide and dicumyl peroxide.

For the purposes of controlling the molecular weight or molecular weight distribution of the polymer or controlling the reaction time, two or more polymerization initiators may be used in combination. The amount of the polymerization initiator used is 0.1 to 20 parts by weight, preferably 1 to 10 parts by weight, based on 100 parts by weight of the monomers to be polymerized.

In the present invention, the charge control agent may be further added to the core material. Negative charge control agents to be added are not particularly limitative, and examples thereof include azo dyes containing metals such as "Varifast Black 3804" (manufactured by Orient Chemical), "Bontron S-31" (manufactured by Orient Chemical), "Bontron S-32" (manufactured by Orient Chemical), "Bontron S-34" (manufactured by Orient Chemical), and "Aizenspilon Black TVH" (manufactured by Hodogaya Kagaku); copper phthalocyanine dye; metal complexes of alkyl derivatives of salicylic acid such as "Bontron E-81" (manufactured by Orient Chemical), "Bontron E-82" (manufactured by Orient Chemical), and "Bontron E-85" (manufactured by Orient Chemical); and quaternary ammonium salts such as "Copy Charge NX VP434" (manufactured by Hoechst); nitroimidazole derivatives, with a preference given to Bontron S-34.

The positive charge control agents are not particularly limitative, and examples thereof include nigrosine dyes such as "Nigrosine Base EX" (manufactured by Orient Chemical), "Oil Black BS" (manufactured by Orient Chemical), "Oil Black SO" (manufactured by Orient Chemical), "Bontron N-01" (manufactured by Orient Chemical), "Bontron N-07" (manufactured by Orient Chemical), and "Bontron N-11 " (manufactured by Orient Chemical); triphenylmethane dyes containing tertiary amines as side chains; quaternary ammonium salt compounds such as "Bontron P-51" (manufactured by Orient Chemical), cetyltrimethylammonium bromide, and "Copy Charge PX VP435" (manufactured by Hoechst); polyamine resins such as "AFP-B" (manufactured by Orient Chemical); and imidazole derivatives, with a preference given to Bontron N-07.

The above charge control agents may be contained in an amount of 0.1 to 8.0% by weight, preferably 0.2 to 5.0% by weight, in the core material.

If necessary, the core material may contain one or more suitable offset inhibitors for the purpose of improving the offset resistance in heat-and-pressure fixing, and examples of the offset inhibitors include polyolefins, metal salts of fatty acids, fatty acid esters, partially saponified fatty acid esters, higher fatty acids, higher alcohols, paraffin waxes, amide waxes, polyhydric alcohol esters, silicone varnish, aliphatic fluorocarbons and silicone oils.

Examples of the above polyolefins include resins such as polypropylene, polyethylene, and polybutene, which have softening points of 80° to 160° C. Examples of the above metal salts of fatty acids include metal salts of maleic acid with zinc, magnesium, and calcium; metal salts of stearic acid with zinc, cadmium, barium, lead, iron, nickel, cobalt, copper, aluminum, and magnesium; dibasic lead stearate; metal salts of oleic acid with zinc, magnesium, iron, cobalt, copper, lead, and calcium; and mixtures thereof. Examples of the above fatty acid esters include ethyl maleate, butyl maleate, methyl stearate, and ethylene glycol montanate. Examples of the above partially saponified fatty acid esters include montanic acid esters partially saponified with calcium. Examples of the above higher fatty acids include dodecanoic acid, lauric acid, palmitic acid, stearic acid, oleic acid, and behenic acid, and mixtures thereof. Examples of the above higher alcohols include dodecyl alcohol, lauryl alcohol, palmityl alcohol, stearyl alcohol, and behenyl alcohol. Examples of the above paraffin waxes include natural paraffins, microcrystalline waxes, synthetic paraffins, and chlorinated hydrocarbons. Examples of the above amide waxes include stearamide, oleamide, behenamide, methylenebisstearamide, ethylenebisstearamide, N,N'-m-xylylenebisstearamide, N,N'-m-xylylenebis-12-hydroxystearamide, N,N'-isophthalic bisstearylamide and N,N'-isophthalic bis-12-hydroxystearylamide. Examples of the above polyhydric alcohol esters include glycerol stearate, propylene glycol monostearate, and sorbitan trioleate. Examples of the above silicone varnishes include methylsilicone varnish, and phenylsilicone varnish. Examples of the above aliphatic fluorocarbons include low polymerized compounds of tetrafluoroethylene and hexafluoropropylene, and fluorinated surfactants disclosed in Japanese Patent Laid-Open No. 124428/1978. Among the above offset inhibitors, a preference is given to the polyolefins, with a particular preference to polypropylene.

It is preferable to use the offset inhibitors in a proportion of 1 to 20% by weight based on the resin contained in the core material.

In the present invention, a coloring agent is contained in the core material of the encapsulated toner, and any of the conventional dyes or pigments, which have been used for coloring agents for the toners may be used.

Examples of the coloring agents used in the present invention include various carbon blacks which may be produced by a thermal black method, an acetylene black method, a channel black method, and a lamp black method; a grafted carbon black, in which the surface of carbon black is coated with a resin; a nigrosine dye, Phthalocyanine Blue, Permanent Brown FG, Brilliant Fast Scarlet, Pigment Green B, Rhodamine-B Base, Solvent Red 49, Solvent Red 146, and Solvent Blue 35, and the mixtures thereof. The coloring agent is usually used in an amount of about 1 to 15 parts by weight based on 100 parts by weight of the resin contained in the core material.

A magnetic encapsulated toner can be prepared by adding a particulate magnetic material to the core material. Examples of the particulate magnetic materials include ferromagnetic metals such as iron, i.e., ferrite or magnetite, cobalt, and nickel, alloys thereof, and compounds containing these elements; alloys not containing any ferromagnetic element which become ferromagnetic by suitable thermal treatment, for example, so-called "Heusler alloys" containing manganese and copper such as a manganese-copper-aluminum alloy, and a manganese-copper-tin alloy; and chromium dioxide, with a preference given to the compounds containing ferromagnetic materials, and a particular preference to magnetite. Such a magnetic material is uniformly dispersed in the core material in the form of a fine powder having an average particle diameter of 0.1 to 1 μm. The content of these magnetic materials is 20 to 70 parts by weight, preferably 30 to 70 parts by weight, based on 100 parts by weight of the encapsulated toner.

When a particulate magnetic material is incorporated into the core material in order to make it a magnetic toner, the material may be treated in a similar manner to that of the coloring agent. Since a particulate magnetic material as such is poor in the affinity for organic substances such as core materials and monomers, the material is used together with a known coupling agent such as a titanium coupling agent, a silane coupling agent or a lecithin coupling agent, with a preference given to the titanium coupling agent, or is treated with such a coupling agent prior to its use, thereby making it possible to uniformly disperse the particulate magnetic materials.

The encapsulated toner for heat-and-pressure fixing of the present invention is preferably produced by the in situ polymerization method from the viewpoint of simplicity in the production facilities and the production steps. The method for production of the present invention by the in situ polymerization are described hereinbelow.

In the method for production of the encapsulated toner according to the present invention, the shell can be formed by utilizing such property that when a mixed solution comprising the core material-constituting material and the shell-forming material such as amorphous polyesters is dispersed in the aqueous dispersant, the shell-forming material becomes localized on the surface of the liquid droplets. Specifically, the separation of the core material-constituting material and the shell-forming material in the liquid droplets of the mixed solution takes place due to the difference in the solubility indices, and the polymerization proceeds in this state to form an encapsulated structure. By this method, since a shell is formed as a layer of shell-forming materials containing an amorphous polyester as the main component with a substantially uniform thickness, the triboelectric charge of the resulting toner becomes uniform.

More precisely, the encapsulated toner of the present invention can be produced by the following steps (a) to (c):

(a) dissolving a shell-forming resin comprising an amorphous polyester as the main component in a mixture comprising a core material-constituting monomer and a coloring agent;

(b) dispersing the mixture obtained in the step (a) in an aqueous dispersant to give a polymerizable composition; and (c) polymerizing the polymerizable composition obtained in step (b) by the in situ polymerization. In the case of the above method, a dispersion stabilizer is required to be contained in the dispersion medium in order to prevent agglomeration and incorporation of the dispersed substances.

Examples of the dispersion stabilizers include gelatin, gelatin derivatives, polyvinyl alcohol, polystyrenesulfonic acid, hydroxymethylcellulose, hydroxyethylcellulose, hydroxypropylcellulose, sodium carboxymethylcellulose, sodium polyacrylate, sodium dodecylbenzenesulfonate, sodium tetradecyl sulfate, sodium pentadecyl sulfate, sodium octyl sulfate, sodium allyl alkyl polyethersulfonate, sodium oleate, sodium laurate, sodium caprate, sodium caprylate, sodium caproate, potassium stearate, calcium oleate, sodium 3,3-disulfonediphenylurea-4,4-diazobisamino-β-naphthol-6-sulfonate, o-carboxybenzeneazodimethylaniline, sodium 2,2,5,5-tetramethyltriphenylmethane-4,4-diazobis-β-naphtholdisulfonate, colloidal silica, alumina, tricalcium phosphate, ferrous hydroxide, titanium hydroxide, and aluminum hydroxide, with a preference given to tricalcium phosphate and sodium dodecylbenzenesulfonate. These dispersion stabilizers may be used alone or in combination of two or more.

Examples of the dispersion media for the dispersion stabilizer include water, methanol, ethanol, propanol, butanol, ethylene glycol, glycerol, acetonitrile, acetone, isopropyl ether, tetrahydrofuran, and dioxane, with a preference given to water. These dispersion media can be used singly or in combination.

In the method of the present invention, the amount of the shell-forming material comprising the above amorphous polyester as the main component is normally 3 to 50 parts by weight, preferably 5 to 40 parts by weight, more preferably 8 to 30 parts by weight, based on 100 parts by weight of the core material. When it is less than 3 parts by weight, the resulting shell becomes too thin in its thickness, thereby making the storage stability of the toner poor. When it exceeds 50 parts by weight, the droplets dispersed in the aqueous dispersant have an undesirably high viscosity, thereby making it difficult to produce fine grains, which in turn results in poor production stability.

Here, the amount of the amorphous polyester having tertiary amine groups is the same as that of the amorphous polyester described above (the first embodiment).

In addition, for the purpose of charge control, the charge control agents exemplified above may be properly added to the shell-forming materials of the encapsulated toner of the present invention. Alternatively, the charge control agent may be used in a mixture with a toner. In such a case, since the shell itself controls chargeability, the amount of these charge control agents, if needed, can be minimized.

Although the particle diameter of the encapsulated toner of the present invention is not particularly limitative, the average particle diameter is usually 3 to 30 μm. The thickness of the shell of the encapsulated toner is preferably 0.01 to 1 μm. When the thickness of the shell is less than 0.01 μm, the blocking resistance of the resulting toner becomes poor, and when it exceeds 1 μm, the heat fusibility of the resulting toner becomes undesirably poor.

In the encapsulated toner of the present invention, a fluidity improver, or a cleanability improver may be used, if necessary. Examples of the fluidity improvers include silica, alumina, titanium oxide, barium titanate, magnesium titanate, calcium titanate, strontium titanate, zinc oxide, quartz sand, clay, mica, wollastonite, diatomaceous earth, chromium oxide, cerium oxide, red oxide, antimony trioxide, magnesium oxide, zirconium oxide, barium sulfate, barium carbonate, calcium carbonate, silicon carbide and silicon nitride, with a preference given to finely powdered silica.

The finely powdered silica is a fine powder having Si—O—Si linkages, which may be prepared by either the dry process or the wet process. The finely powdered silica may be not only anhydrous silicon dioxide but also any one of aluminum silicate, sodium silicate, potassium silicate, magnesium silicate and zinc silicate, with a preference given to those containing not less than 85% by weight of $SiO_2$. Further, finely powdered silica surface-treated with a silane coupling agent, a titanium coupling agent, silicone oil, and silicone oil having amine in the side chain thereof can be used.

The cleanability improvers include fine powders of metal salts of higher fatty acids typically exemplified by zinc stearate or fluorocarbon polymers.

Further, for the purpose of controlling the developability of the encapsulated toner, finely powdered polymers of methyl methacrylate or butyl methacrylate may be added.

Furthermore, for the purposes of reducing the surface resistance of the toner, a small amount of carbon black may be used. The carbon blacks may be those of conventionally known, including various kinds such as furnace black, channel black, and acetylene black.

When the encapsulated toner of the present invention contains a particulate magnetic material, it can be used alone as a developer, while when the encapsulated toner does not contain any particulate magnetic material, a non-magnetic one-component developer or a two-component developer can be prepared by mixing the toner with a carrier. Although the carrier is not particularly limitative, examples thereof include iron powder, ferrite, glass beads, those of above with resin coatings, and resin carriers in which magnetite fine powders or ferrite fine powders are blended into the resins. The mixing ratio of the toner to the carrier is 0.5 to 20% by weight. The particle diameter of the carrier is 15 to 500 μm.

When the encapsulated toner of the present invention is fixed on a recording medium such as paper by heat and pressure, an excellent fixing strength is attained. As for the heat-and-pressure fixing process to be suitably used in the fixing of the toner of the present invention, any one may be used as long as both heat and pressure are utilized. Examples of the fixing processes which can be suitably used in the present invention include a known heat roller fixing process; a fixing process as disclosed in Japanese Patent Laid Open No. 190870/1990 in which visible images formed on a recording medium in an unfixed state are fixed by heating and fusing the visible images through the heat-resistant sheet with a heating means, comprising a heating portion and a heat-resistant sheet, thereby fixing the visible images onto the recording medium; and a heat-and-pressure process as disclosed in Japanese Patent Laid-Open No. 162356/1990 in which the formed visible images are fixed on a recording medium through a film by using a heating element fixed to a support and a pressing member arranged opposite to the heating element in contact therewith under pressure.

Since the encapsulated toner for heat-and-pressure fixing of the present invention described above contains an amorphous polyester resin as the main component of the shell of the encapsulated toner, it has an excellent offset resistance and fixing ability even at a low temperature, and also it has an excellent blocking resistance. Thus, clear images free from background contamination can be stably formed for a large number of copying in a heat-and-pressure fixing method using a heat roller. Also, by using the above specific amorphous polyester having a positive charge in place of the above negatively charged amorphous polyester as the main component of the shell material of the encapsulated toner, the resulting toner has a quick triboelectric charging, a stable positive charge and also it has an excellent offset resistance and fixing ability even at a low temperature. Thus, clear images free from background contamination can be stably formed for a large number of copying in a heat-and-pressure fixing method using a heat roller.

EXAMPLES

The present invention is hereinafter described in more detail by means of the following working examples, comparative examples and test examples, but the present invention is not limited by these examples. Resin Production Example 1

367.5 g of a propylene oxide adduct of bisphenol A (average adduct molar number: 2.2, hereinafter abbreviated as "BPA•PO"), 146.4 g of an ethylene oxide adduct of bisphenol A (average adduct molar number: 2.2, hereinafter abbreviated as "BPA•EO"), 126.0 g of terephthalic acid (hereinafter abbreviated as "TPA"), 40.2 g of dodecenyl succinic anhydride (hereinafter abbreviated as "DSA"), and 77.7 g of trimellitic anhydride (hereinafter abbreviated as "TMA") are placed in a two-liter four-necked glass flask equipped with a thermometer, a stainless steel stirring rod, a reflux condenser and a nitrogen inlet tube, and heated at 220° C. in a mantle heater under a nitrogen gas stream while stirring to react the above components.

The degree of polymerization is monitored from a softening point measured according to ASTM E 28-67, and the reaction is terminated when the softening point reaches 110° C. This resin is referred to as "Resin A."

The similar procedures to above are carried out to produce Resins B and C. The compositions thereof are shown in Table 1. Also, the glass transition temperature of each of the resins thus obtained (Resins A to C) is measured by the differential scanning calorimeter ("DSC Model 220," manufactured by Seiko Instruments, Inc.), and the values are shown together with the softening points and acid values in Table 2. The acid values are measured by the method according to JIS K0070.

TABLE 1

| | Monomer (mol %) | | | | | |
|---|---|---|---|---|---|---|
| Resin | BPA.PO | BPA.EO | Trimethylol-propane | TPA | DSA | TMA |
| A | 70 | 30 | — | 50 | 10 | 27 |
| B | 100 | — | — | 55 | 40 | — |
| C | 65 | 10 | 13 | 90 | 5 | — |

Resin Production Example 2

630 g of BPA•PO, 585 g of BPA•EO, 780 g of dimethyl terephthalic acid, and 35 g of isophthalic acid are placed in a three-liter four-necked glass flask equipped with a thermometer, a stainless steel stirring rod, a reflux condenser and a nitrogen inlet tube, and heated at 220° C. in a mantle heater under a nitrogen gas stream while stirring to react the above components.

The degree of polymerization is monitored from a softening point measured according to ASTM E 28-67. At a point where the softening point reaches 115° C., 60 g of triethanolamine is added. The reaction is then continued at 200° C., and the reaction is terminated when the softening point reaches 110° C. The amorphous polyester having tertiary amine groups thus obtained is referred to as "Resin D."

Resin Production Example 3

630 g of BPA•PO, 585 g of BPA•EO, and 600 g of TPA are placed in a three-liter four-necked glass flask equipped with a thermometer, a stainless steel stirring rod, a reflux condenser and a nitrogen inlet tube, and heated at 220° C. in a mantle heater under a nitrogen gas stream while stirring to react the above components.

The degree of polymerization is monitored from a softening point measured according to ASTM E 28-67. At a point where the softening point reaches 115° C., 60 g of triethanolamine is added. The reaction is then continued at 200° C., and the reaction is terminated when the softening point reaches 110° C. The amorphous polyester having tertiary amine groups thus obtained is referred to as "Resin E."

Resin Production Example 4

630 g of BPA•PO, 23.8 g of N,N-bis(2-hydroxyethyl) methylamine and 190 g of succinic anhydride are placed in a two-liter four-necked glass flask equipped with a thermometer, a stainless steel stirring rod, a reflux condenser and a nitrogen inlet tube, and heated at 220° C. in a mantle heater under a nitrogen gas stream while stirring to react the above components.

The degree of polymerization is monitored from a softening point measured according to ASTM E 28-67, and the reaction is terminated when the softening point reaches 110° C. The amorphous polyester having tertiary amine groups thus obtained is referred to as "Resin F."

The glass transition temperature of each of the resins thus obtained (Resins D to F) is measured by the differential scanning calorimeter ("DSC Model 220," manufactured by Seiko Instruments, Inc.), and the values are shown together with the softening points, acid values and total amine values in Table 2. The acid values are measured by the method according to JIS K0070. The total amine values are measured by the method according to ASTM D-2073-66.

TABLE 2

| Resin | Softening Point (°C.) | Glass Transition Temperature (°C.) | Acid Value (KoH mg/g) | Total Amine Value (KoH mg/g) |
|---|---|---|---|---|
| A | 110 | 65 | 18 | — |
| B | 110 | 63 | 10 | — |
| C | 110 | 70 | 15 | — |
| D | 110 | 65 | 6 | 12.3 |
| E | 110 | 63 | 8 | 12.9 |
| F | 110 | 62 | 5 | 13.9 |

Example 1

20 parts by weight of Resin A and 3.5 parts by weight of 2,2'-azobisisobutyronitrile are added to a mixture comprising 69.0 parts by weight of styrene, 31.0 parts by weight of 2-ethylhexyl acrylate, 0.9 parts by weight of divinylbenzene and 7.0 parts by weight of carbon black "#44" (manufactured by Mitsubishi Kasei Corporation). The obtained mixture is introduced into an attritor (Model MA-01SC, manufactured by Mitsui Miike Kakoki) and dispersed at 10° C. for 5 hours to give a polymerizable composition.

Next, 240 g of the above polymerizable composition is added to 560 g of a 4% by weight aqueous colloidal solution of tricalcium phosphate which is previously prepared in a two-liter separable glass flask. The obtained mixture is emulsified and dispersed with "T.K. HOMO MIXER, Model M" (manufactured by Tokushu Kika Kogyo) at 15° C. and a rotational speed of 12000 rpm for 5 minutes.

Next, a four-necked glass cap is set on the flask, and a reflux condenser, a thermometer, a nitrogen inlet tube and a stainless steel stirring rod are attached thereto. The flask is placed in an electric mantle heater. Thereafter, the contents are heated to 85° C. and reacted at 85° C. for 10 hours in a nitrogen atmosphere while stirring. After cooling the reaction product, the dispersing agent is dissolved into 10%-aqueous hydrochloric acid. The resulting product is filtered, and the obtained solid is washed with water, dried under a reduced pressure of 20 mmHg at 45° C. for 12 hours and classified with an air classifier to give an encapsulated toner with an average particle size of 8 μm whose shell comprises an amorphous polyester. Here, the amorphous polyester has no tertiary amine groups.

To 100 parts by weight of this encapsulated toner, 0.4 parts by weight of hydrophobic silica fine powder "Aerozil R-972" (manufactured by Nippon Aerozil Ltd.) is added and mixed to obtain the encapsulated toner according to the present invention. This toner is referred to as "Toner 1." The glass transition temperature assignable to the resin contained in the core material is 30.6° C., and the softening point of Toner 1 determined by a flow tester is 125.5° C.

Here, the "softening point determined by a flow tester" used herein refers to the temperature corresponding to one-half of the height (h) of the S-shaped curve showing the relationship between the downward movement of a plunger (flow length) and temperature, when measured by using a flow tester of the "koka" type manufactured by Shimadzu Corporation in which a 1 $cm^3$ sample is extruded through a nozzle having a dice pore size of 1 mm and a length of 1 mm, while heating the sample so as to raise the temperature at a rate of 6° C./min and applying a load of 20 $kg/cm^2$ thereto with the plunger.

Example 2

100 parts by weight of a copolymer obtained by copolymerizing 75 parts by weight of styrene and 25 parts by weight of n-butyl acrylate, the copolymer having a softening point of 75.3° C. and a glass transition temperature of 40.5° C., are premixed together with 6 parts by weight of copper phthalocyanine "Sumikaprint Cyanine Blue GN-O" (manufactured by Sumitomo Chemical Co., Ltd.), 15 parts by weight of Resin B, and 5 parts by weight of polypropylene wax "Viscol 550p" (manufactured by Sanyo Chemical Industries, Ltd.), and melt-kneaded in a twin-screw extruder, cooled and pulverized. 40 parts by weight of this kneaded mixture are mixed with 50 parts by weight of styrene, 15 parts by weight of n-butyl acrylate and 2.5 parts by weight of 2,2'-azobisisobutyronitrile to give a polymerizable composition:

Next, 240 g of the above polymerizable composition is added to 560 g of a 4% by weight aqueous colloidal solution of tricalcium phosphate which is previously prepared in a two-liter separable glass flask. The obtained mixture is emulsified and dispersed with a "T.K. HOMO MIXER, Model M" (manufactured by Tokushu Kika Kogyo) at 15° C. and a rotational speed of 12000 rpm for 2 minutes.

Next, a four-necked glass cap is set on the flask, and a reflux condenser, a thermometer, a nitrogen inlet tube and a stainless steel stirring rod are attached thereto. The flask is placed in an electric mantle heater. Thereafter, the contents are heated to 85° C. and reacted at 85° C. for 10 hours in a nitrogen atmosphere while stirring. After cooling the reaction product, the dispersing agent is dissolved into 10%-aqueous hydrochloric acid. The resulting product is filtered, and the obtained solid is washed with water, dried under a reduced pressure of 20 mmHg at 45° C. for 12 hours and classified with an air classifier to give an encapsulated toner with an average particle size of 8 μm whose shell comprises an amorphous polyester. Here, the amorphous polyester has no tertiary amine groups.

To 100 parts by weight of this encapsulated toner, 0.4 parts by weight of hydrophobic silica fine powder "Aerozil R-972" (manufactured by Nippon Aerozil Ltd.) is added and mixed to obtain the encapsulated toner according to the present invention. This toner is referred to as "Toner 2." The glass transition temperature assignable to the resin contained in the core material is 33.2° C., and the softening point of Toner 2 determined by a flow tester is 122.8° C.

Example 3

20 parts by weight of Resin C and 5.0 parts by weight of lauroyl peroxide are added to a mixture comprising 50 parts by weight of styrene, 35.0 parts by weight of 2-ethylhexyl acrylate, 1.0 part by weight of divinylbenzene, 1.0 part by weight of dimethylaminoethyl methacrylate and 40.0 parts. by weight of styrene-grafted carbon black "GP-E-3" (manufactured by Ryoyu Kogyo) to give a polymerizable composition.

Next, 240 g of the above polymerizable composition is added to 560 g of a 4% by weight aqueous colloidal solution of tricalcium phosphate which is previously prepared in a two-liter separable glass flask. The obtained mixture is emulsified and dispersed with "T.K. HOMO MIXER, Model M" (manufactured by Tokushu Kika Kogyo) at 15° C. and a rotational speed of 12000 rpm for 5 minutes.

Next, a four-necked glass cap is set on the flask, and a reflux condenser, a thermometer, a nitrogen inlet tube and a stainless steel stirring rod are attached thereto. The flask is placed in an electric mantle heater. Thereafter, the contents are heated to 85° C. and reacted at 85° C. for 10 hours in a nitrogen atmosphere while stirring. After cooling the reaction product, the dispersing agent is dissolved into 10%-aqueous hydrochloric acid. The resulting product is filtered and the obtained solid is washed with water, dried under a reduced pressure of 20 mmHg at 45° C. for 12 hours and classified with an air classifier to give an encapsulated toner with an average particle size of 8 μm whose shell comprises an amorphous polyester. Here, the amorphous polyester has no tertiary amine groups.

To 100 parts by weight of this encapsulated toner, 0.4 parts by weight of hydrophobic silica fine powder "Aerozil R-972" (manufactured by Nippon Aerozil Ltd.) is added and mixed to obtain the encapsulated toner according to the present invention. This toner is referred to as "Toner 3." The glass transition temperature assignable to the resin contained in the core material is 33.5° C., and the softening point of Toner 3 determined by a flow tester is 124.3° C.

Example 4

18 parts by weight of Resin A, 2.0 parts by weight of a copolymer obtained by copolymerizing maleic anhydride and styrene.(molar ratio of maleic anhydride:styrene=1:3; molecular weight: 1900; glass transition temperature: 124.7° C.), and 3.5 parts by weight of 2,2'-azobisisobutyronitrile are added to a mixture comprising 65.0 parts by weight of styrene, 35.0 parts by weight of 2-ethylhexyl acrylate, 0.9 parts by weight of divinylbenzene, and 7.0 parts by weight of carbon black "#44" (manufactured by Mitsubishi Kasei Corporation). The obtained mixture is introduced into an attritor (Model MA-01SC, manufactured by Mitsui Miike Kakoki) and dispersed at 10° C. for 5 hours to give a polymerizable composition.

Next, 240 g of the above polymerizable composition is added to 560 g of a 4% by weight aqueous colloidal solution of tricalcium phosphate which is previously prepared in a two-liter separable glass flask. The obtained mixture is emulsified and dispersed with "T.K. HOMO MIXER, Model M" (manufactured by Tokushu Kika Kogyo) at 15° C. and a rotational speed of 12000 rpm for 5 minutes.

Next, a four-necked glass cap is set on the flask, and a reflux condenser, a thermometer, a nitrogen inlet tube and a stainless steel stirring rod are attached thereto. The flask is placed in an electric mantle heater. Thereafter, the contents are heated to 85° C. and reacted at 85° C. for 10 hours in a nitrogen gas stream while stirring. After cooling the reaction product, the dispersing agent is dissolved into 10%-aqueous hydrochloric acid. The resulting product is filtered, and the obtained solid is washed with water, dried under a reduced pressure of 20 mmHg at 45° C. for 12 hours and classified with an air classifier to give an encapsulated toner with an average particle size of 8 μm whose shell comprises an amorphous polyester and a copolymer having one or more acid anhydride groups as the main components. Here, the amorphous polyester has no tertiary amine groups.

To 100 parts by weight of this encapsulated toner, 0.4 parts by weight of hydrophobic silica fine powder "Aerozil R-972" (manufactured by Nippon Aerozil Ltd.) is added and mixed to obtain the encapsulated toner according to the present invention. This toner is referred to as "Toner 4." The glass transition temperature assignable to the resin contained in the core material is 30.2° C., and the softening point of Toner 4 determined by a flow tester is 122.8° C.

Example 5

20 parts by weight of Resin D and 3.5 parts by weight of 2,2'-azobisisobutyronitrile are added to a mixture comprising 69.0 parts by weight of styrene, 31.0 parts by weight of 2-ethylhexyl acrylate, 0.9 parts by weight of divinylbenzene and 7.0 parts by weight of carbon black "#44" (manufactured by Mitsubishi Kasei Corporation). The obtained mixture is introduced into an attritor (Model MA-01SC, manufactured by Mitsui Miuke Kakoki) and dispersed at 15° C. for 5 hours to give a polymerizable composition.

Next, 240 g of the above polymerizable composition is added to 560 g of a 4% by weight aqueous colloidal solution of tricalcium phosphate which is previously prepared in a two-liter separable glass flask. The obtained mixture is emulsified and dispersed with "T.K. HOMO MIXER, Model M" (manufactured by Tokushu Kika Kogyo) at 15° C. and a rotational speed of 12000 rpm for 5 minutes.

Next, a four-necked glass cap is set on the flask, and a reflux condenser, a thermometer, a nitrogen inlet tube and a stainless steel stirring rod are attached thereto. The flask is placed in an electric mantle heater. Thereafter, the contents are heated to 85° C. and reacted at 85° C. for 10 hours in a nitrogen atmosphere while stirring. After cooling the reaction product, the dispersing agent is dissolved into 10%-aqueous hydrochloric acid. The resulting product is filtered, and the obtained solid is washed with water, dried under a reduced pressure of 20 mmHg at 45° C. for 12 hours and classified with an air classifier to give an encapsulated toner with an average particle size of 8 μm whose shell comprises an amorphous polyester having tertiary amine groups.

To 100 parts by weight of this encapsulated toner, 0.4 parts by weight of hydrophobic silica fine powder "Aerozil R-972" (manufactured by Nippon Aerozil Ltd.) is added and mixed to obtain the encapsulated toner according to the present invention. This toner is referred to as "Toner 5." The glass transition temperature assignable to the resin contained in the core material is 32.7° C., and the softening point of Toner 5 determined by a flow tester is 119.2° C.

Example 6

20 parts by weight of carbon black "GPT-505P" (manufactured by Ryoyu Kogyo) is added to a mixture comprising 69.0 parts by weight of styrene, 31.0 parts by weight of 2-ethylhexyl acrylate, 0.7 parts by weight of divinylbenzene, 4.0 parts by weight of 2,2'-azobisisobutyronitrile and 20 parts by weight of Resin E, and the obtained mixture is dispersed for 1 hour using a magnetic stirrer to give a polymerizable composition.

Next, 240 g of the above polymerizable composition is added to 560 g of a 4% by weight aqueous colloidal solution of tricalcium phosphate which is previously prepared in a two-liter separable glass flask. The obtained mixture is emulsified and dispersed with "T.K. HOMO MIXER, Model M" (manufactured by Tokushu Kika Kogyo) at 15° C. and a rotational speed of 10,000 rpm for 2 minutes.

Next, a four-necked glass cap is set on the flask, and a reflux condenser, a thermometer, a nitrogen inlet tube and a stainless steel stirring rod are attached thereto. The flask is placed in an electric mantle heater. Thereafter, the contents are heated to 85° C. and reacted at 85° C. for 10 hours in a nitrogen atmosphere while stirring. After cooling the reaction product, the dispersing agent is dissolved into 10%-aqueous hydrochloric acid. The resulting product is filtered and the obtained solid is washed with water, dried under a reduced pressure of 20 mmHg at 45° C. for 12 hours and classified with an air classifier to give an encapsulated toner with an average particle size of 8 μm whose shell comprises an amorphous polyester having tertiary amine groups.

To 100 parts by weight of this encapsulated toner, 0.4 parts by weight of hydrophobic silica fine powder "Aerozil R-972" (manufactured by Nippon Aerozil Ltd.) is added and mixed to obtain the encapsulated toner according to the present invention. This toner is referred to as "Toner 6." The glass transition temperature assignable to the resin contained in the core material is 29.5° C., and the softening point of Toner 6 determined by a flow tester is 123.3° C.

Example 7

The similar procedures to those of Example 6 are carried out up to the surface treatment step except that 20 parts by weight of Resin E is replaced with 15 parts by weight of Resin D and 5 parts by weight of Resin A to give an encapsulated toner with an average particle size of 8 μm whose shell comprises an amorphous polyester having tertiary amine groups as the main component. This toner is referred to as "Toner 7." The glass transition temperature assignable to the resin contained in the core material is 26.8° C., and the softening point of Toner 7 determined by a flow tester is 119.8° C.

Example 8

The similar procedures to those of Example 5 are carried out up to the surface treatment step except that 20 parts by weight of Resin D is replaced with 20 parts by weight of Resin F to give an encapsulated toner with an average particle size of 8 μm whose shell comprises an amorphous polyester having tertiary amine groups as the main component. This toner is referred to as "Toner 8." The glass transition temperature assignable to the resin contained in the core material is 32.5° C., and the softening point of Toner 8 determined by a flow tester is 120.5° C.

Comparative Example 1

3.5 parts by weight of 2,2'-azobisisobutyronitrile and 9.5 parts by weight of 4,4'-diphenylmethane diisocyanate "Millionate MT" (manufactured by Nippon Polyurethane Industry Co., Ltd.) are added to a mixture comprising 70.0 parts by weight of styrene, 30.0 parts by weight of 2-ethyihexyl acrylate, 1.0 part by weight of divinylbenzene, and 10.0 parts by weight of carbon black "#44" (manufactured by Mitsubishi Kasei Corporation). The obtained mixture is introduced into an attritor (Model MA-01SC, manufactured by Mitsui Miuke Kakoki) and dispersed at 10° C. for 5 hours to give a polymerizable composition.

Next, 240 g of the above polymerizable composition is added to 560 g of a 4% by weight aqueous colloidal solution of tricalcium phosphate Which is previously prepared in a two-liter separable glass flask. The obtained mixture is emulsified and dispersed with "T.K. HOMO MIXER, Model M" (manufactured by Tokushu Kika Kogyo) at 15° C. and a rotational speed of 12000 rpm for 2 minutes.

Next, a four-necked glass cap is set on the flask, and a reflux condenser, a thermometer, a nitrogen inlet tube and a stainless steel stirring rod are attached thereto. The flask is placed in an electric mantle heater. A mixture solution of 7.5 parts by weight of ethylenediamine, 0.5 parts by weight of dibutyltin dilaurate and 40 g of ion-exchanged water is prepared, and the resulting mixture is dropped into the flask in a period of 30 minutes through the dropping funnel while stirring. Thereafter, the contents are heated to 80° C. and reacted at 80° C. for 10 hours in a nitrogen atmosphere while stirring. After cooling the reaction product, the dispersing agent is dissolved into 10%-aqueous hydrochloric acid. The resulting product is filtered, and the obtained solid is washed with water, dried under a reduced pressure of 20 mmHg at 45° C. for 12 hours and classified with an air classifier to give the encapsulated toner with an average particle size of 8 µm whose shell comprises a polyurea resin.

To 100 parts by weight of this encapsulated toner, 0.4 parts by weight of hydrophobic silica fine powder "Aerozil R-972" (manufactured by Nippon Aerozil Ltd.) is added and mixed to obtain an encapsulated toner. This toner is referred to as "Comparative Toner 1." The glass transition temperature assignable to the resin contained in the core material is 33.5° C., and the softening point of Comparative Toner 1 determined by a flow tester is 137.0° C.

Comparative Example 2

The similar procedures to those of Example 1 are carried out up to the step where the solid obtained by filtration is washed with water after the polymerization reaction step, except that Resin A is not used. It is dried under a reduced pressure of 10 mmHg at 20° C. for 12 hours and classified with an air classifier to give a non-encapsulated toner with an average particle size of 8 µm.

To 100 parts by weight of this non-encapsulated toner, 0.4 parts by weight of hydrophobic silica fine powder "Aerozil R-972" (manufactured by Nippon Aerozil Ltd.) is added and mixed to obtain a toner. This toner is referred to as "Comparative Toner 2." The glass transition temperature assignable to the resin contained in the core material is 30.5° C., and the softening point of Comparative Toner 2 determined by a flow tester is 115.5° C.

Test Example 1

A developer is prepared by placing 6 parts by weight of each of the toners obtained in Examples 1 through 4 and Comparative Examples 1 and 2 and 94 parts by weight of spherical ferrite powder coated with styrene-methyl methacrylate copolymer resin having a particle size of 250 mesh-pass and 400 mesh-on into a polyethylene container, and mixing the above components by rotation of the container on the roller at a rotational speed of 150 rpm for 20 minutes. The resulting developer is evaluated with respect to the triboelectric charge, the fixing ability, the offset resistance and the blocking resistance.

(1) Triboelectric Charge

The tribo electric charge is measured by a blow-off type electric charge measuring device as described below. Specifically, a specific charge measuring device equipped with a Faraday cage, a capacitor and an electroaieter is used. First, W (g) (about 0.15 to 0.20 g) of the developer prepared above is placed into a brass measurement c ell equipped with a s tainless screen of 500 mesh, which is adjustable to any mesh size to block the passing of the carrier particles. Next, after aspirating from a suction opening for 5 seconds, blowing is carried out for 5 seconds under a pressure indicated by a barometric regulator of 0.6 kgf/cm$^2$, thereby selectively removing only the toner from the cell.

In this case, the voltage of the electrometer after 2 seconds from the start of blowing is defined as V (volt). Here, when the electric capacitance of the capacitor is defined as C (µF), the triboelectric charge Q/m of this toner can be calculated by the fallowing equation:

$$Q/m(\mu C/g)=C\times V/m$$

Here, m is the weight of the toner contained in W (g) of the developer. Whe n the weight of the toner in the developer is defined as T (g) and the weight of the developer as D (g), the toner concentration in a given sample can be expressed as T/D×100(%), and m can be calculated as shown in the following equation:

$$m(g)=W\times(T/D)$$

The measurement results of the triboelectric charge of the develop er prepared under normal conditions are shown in Table 3.

In addition, the triboelectric charge of the toners after copying 50,000 sheets is measured by loading each of the developer on a commercially available electro-photographic copying machine (equipped with a selene-arsenic photoconductor for Toners 1, 2, 4 and Comparative Toner 2, or an organic photoconductor for Toner 3 and Comparative Toner 1; a fixing roller having a rotational speed of 255 mm/sec; and a toner concentration of 6%). The results are shown in Table 3. Also, the image quality determined by the extent of background generated during the continuous copying test and the toner dust in the device are also evaluated and shown together in Table 3.

TABLE 3

| | TriboElectric Charge (µC/g) (23° C., 50% RH) | | During Continuous Copying Test | |
|---|---|---|---|---|
| | At Start | After Copying 50,000 Sheets | Image Quality | Toner Dust in Machine |
| Toner 1 | −25.0 | −25.3 | Good | None |
| Toner 2 | −24.6 | −24.4 | Good | None |
| Toner 3 | +15.5 | +15.1 | Good | None |
| Toner 4 | −25.4 | −25.6 | Good | None |
| Comparative Toner 1 | +15.0 | +14.8 | Good | None |
| Comparative Toner 2 | −24.0 | −0.5 | High Background | Much |

(2) Fixing Ability

The fixing ability is evaluated by the method as described below. Specifically, each of the developers prepared as described above is loaded on a commercially available electrophotographic copying machine to develop images. The copying machine is equipped with a selene-arsenic photoconductor for Toners 1, 2, 4 and Comparative Toner 2, or an organic photoconductor for Toner 3 and Comparative Toner 1; a fixing roller having a rotational speed of 255 mm/sec; a fixing device with variable heat-and-pressure and temperature; and an oil applying device being removed from the copying machine. By controlling the fixing temperature from 70° C. to 220° C., the fixing ability of the formed images is evaluated. The results are shown in Table 4.

The lowest fixing temperature used herein is the temperature of the fixing roller at which the fixing ratio of the toner exceeds 70%. This fixing ratio of the toner is determined by placing a load of 500 g on a sand-containing rubber eraser (LION No. 502) having a bottom area of 15 mm×7.5 mm which contacts the fixed toner image, placing the loaded eraser on a fixed toner image obtained in the fixing device, moving the loaded eraser on the image backward and forward five times, measuring the optical reflective density of the eraser-treated image with a reflective densitometer manufactured by Macbeth Co., and then calculating the fixing ratio from this density value and a density value before the eraser treatment using the following equation.

$$\text{Fixing ratio} = \frac{\text{Image density after eraser treatment}}{\text{Image density before eraser treatment}} \times 100$$

(3) Offset Resistance

The offset resistance is evaluated by measuring the temperature of the low-temperature offset disappearance and the temperature of the high-temperature offset initiation using the same testing apparatus under the same testing conditions as in the fixing ability test. Specifically, copying tests are carried out by raising the temperature of the heat roller surface at an increment of 5° C. in the range from 70° C. to 220° C., and at each temperature, the adhesion of the toner onto the heat roller surface for fixing is evaluated with naked eyes.

The results are also shown in Table 4.

(4) Blocking Resistance

The blocking resistance is determined by evaluating the extent of the generation of agglomeration of particles after allowing the toner to stand under a temperature of 50° C. and a relative humidity of 40% for 24 hours. The results are also shown in Table 4.

TABLE 4

| | Lowest Fixing Temp. (°C.) | Low-Temp. Offset Disappearing Temp. (°C.) | High-Temp. Offset Initiating Temp. (°C.) | Blocking Resistance |
|---|---|---|---|---|
| Toner 1 | 122 | 100 | 220 < | Good |
| Toner 2 | 118 | 90 | 220 < | Good |
| Toner 3 | 120 | 90 | 220 < | Good |
| Toner 4 | 120 | 100 | 220 < | Good |
| Comparative Toner 1 | 200 | 110 | 220 < | Good |
| Comparative Toner 2 | 110 | 100 | 180 | Poor |

As is clear from Table 3, with respect to Toners 1 through 4 according to the present invention and Comparative Toner 1, the values for the triboelectric charges are appropriate, showing only a small change of triboelectric charge after copying 50,000 sheets, thereby maintaining excellent image quality. However, in Comparative Toner 2, since scumming of the toner onto the carrier take place, their polarity is reversed after copying 50,000 sheets. In addition, when Comparative Toner 2 is used, the image contamination owing to the high background takes place during the copy ing operation presumably due to the generation of a large number of reversed charged particles, and the toner dust in the copying machine also takes place.

Further, as is clear from Table 4, in Toners 1 through 4, all of them have low lowest fixing temperatures and wide non-offsetting regions. However, in Comparative Toner 1, since the melting point of the polyurea resin used as the shell material is high (more than 300° C.), its lowest fixing temperature is high (200° C.). Since Comparative Toner 2 consists of the core material alone of Toner 1, it has poor blocking resistance.

Test Example 2

Each of the toners obtained in Examples 5 through 8 is evaluated with respect to the storage stability, the tribo electric charge, the fixing ability and the offset resistance.

(1) Storage Stability

The storage stability is determined by measuring 5 g of each toner in an aluminum cup having a diameter of 90 mm, keeping it standing for 24 hours under the conditions at a temperature of 50° C. and a relative humidity of 40%, and evaluating the extent of the generation of agglomeration. The results are shown in Table 5.

TABLE 5

| | Storage Stability |
|---|---|
| Toner 5 | Good |
| Toner 6 | Good |
| Toner 7 | Good |
| Toner 8 | Good |

(2) Triboelectric Charge

A developer is prepared by placing 4 parts by weight of each of the toners obtained in Examples 5 through 8 and 96 parts by weight of spherical ferrite powder coated with phenylsilicone resin having a particle size of 250 mesh-pass and 400 mesh-on into a polyethylene container, and mixing the above components by rotation of the container on the roller at a rotational speed of 150 rpm for 20 minutes. The resulting developer is evaluated with respect to the triboelectric charge.

The triboelectric charge is measured by a blow-off type electric charge measuring. device as described above in Test Example 1. Each of the developer is loaded on a commercially available electrophotographic copying machine (equipped with an organic photoconductor; a fixing roller having a rotational speed of 255 mm/sec; and a toner concentration of 4%). The results are shown in Table 6 together with those measured after copying 50,000 sheets. Also, the image density and the image quality determined by the extent of background generated during the continuous copying test and the toner dust in the device are also evaluated and shown together in Table 6.

TABLE 6

| | Triboelectric Charge (μC/g) (23° C., 50% RH) | | Image Density | | Image Quality | |
|---|---|---|---|---|---|---|
| | At Start | After Copying 50,000 Sheets | At Start | After Copying 50,000 Sheets | During Continuous Copying Test | Toner Dust in Machine |
| Toner 5 | +18.0 | +18.3 | 1.41 | 1.40 | Good | None |
| Toner 6 | +20.5 | +21.0 | 1.35 | 1.36 | Good | None |
| Toner 7 | +14.0 | +14.2 | 1.45 | 1.45 | Good | None |
| Toner 8 | +18.2 | +18.0 | 1.40 | 1.41 | Good | None |

(3) Fixing Ability

The fixing ability is evaluated by the method as described below. Specifically, each of the developers prepared as described above is loaded on a commercially available electrophotographic copying machine to develop images. The copying machine is equipped with an organic photoconductor; a fixing roller having a rotational speed of 255 mm/sec; a fixing device with variable heat-and-pressure and temperature; and an oil applying device being removed from the copying machine. By controlling the fixing temperature from 70° C. to 220° C., the fixing ability of the formed images is evaluated in the same manner as in Test Example 1. The results are shown in Table 7.

(4) Offset Resistance

The offset resistance is evaluated in the same manner as in Test Example 1 by measuring the temperature of the low-temperature offset disappearance and the temperature of the high-temperature offset initiation using the same testing apparatus under the same testing conditions as in the fixing ability test. The results are also shown in Table 7.

TABLE 7

| | Lowest Fixing Temp. (°C.) | Low-Temp. Offset Disappearing Temp. (°C.) | High-Temp. Offset Initiating Temp. (°C.) |
|---|---|---|---|
| Toner 5 | 120 | 100 | 220 < |
| Toner 6 | 124 | 100 | 220 < |
| Toner 7 | 122 | 100 | 220 < |
| Toner 8 | 120 | 100 | 220 < |

As is clear from Tables 5 through 7, Toners 5 through 8 show high values of triboelectric charge at start and also show only a small change of triboelectric charge after copying 50,000 sheets, and thus showing excellent stability in triboelectric charge. Also, they show only small changes in the image density and the image quality, the toner dust in the copying machine does not take place, and further they show excellent storage stability. Further, in Toner 7, by using an amorphous polyester having tertiary amine groups together with an amorphous polyester without tertiary amine groups, positive electric charge can be well-controlled. Moreover, in Toners 5 through 8, all of them are low in the lowest fixing temperatures and wide in the non-offsetting regions, thereby showing excellent fixing ability.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An encapsulated toner for heat-and-pressure fixing comprising a heat-fusible core material containing at least a thermoplastic resin having a glass transition temperature of 10° C. to 50° C. and a coloring agent and a shell formed thereon so as to cover the surface of the core material, wherein the shell comprises an amorphous polyester having an acid value of 3 to 50 KOH mg/g as the main component, wherein said amorphous polyester is obtained by a condensation polymerization of monomers containing a dihydric alcohol monomer and a dicarboxylic acid monomer, and further at least a trihydric or higher polyhvdric alcohol monomer and/or a tricarboxylic or higher polycarboxylic acid monomer, and the amount of the amorphous polyester is 3 to 50 parts by weight, based on 100 parts by weight of the core material.

2. The encapsulated toner for heat-and-pressure fixing according to claim 1, wherein the shell consists essentially of an amorphous polyester.

3. The encapsulated toner for heat-and-pressure fixing according to claim 1, wherein the shell comprises at least an amorphous polyester and a copolymer having one or more acid anhydride groups.

4. The encapsulated toner for heat-and-pressure fixing according to claim 1, wherein said amorphous polyester has a glass transition temperature of 50° C. to 80° C.

5. The encapsulated toner for heat-and-pressure fixing according to claim 1, wherein the shell comprises an amorphous polyester having tertiary amine groups as the main component.

6. The encapsulated toner for heat-and-pressure fixing according to claim 5, wherein the amorphous polyester having tertiary amine groups is obtained by a condensation polymerization of a monomer mixture containing a monomer having one or more tertiary amine groups, and wherein the monomer having one or more tertiary amine groups is one or more kinds selected from the group consisting of dihydric or higher polyhydric alcohol monomers and dicarboxylic or higher polycarboxylic acid monomers having the chemical structures represented by the following general formulas (I) to (III) in the molecule, and the dihydric or higher polyhydric alcohol monomers represented by the following general formula (IV):

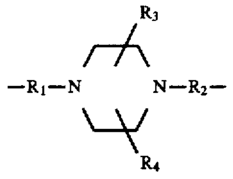
(I)

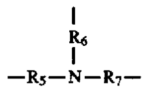
(II)

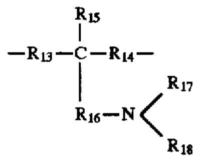
(III)

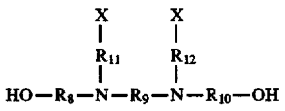
(IV)

wherein $R_1$, $R_2$, $R_5$, $R_7$, $R_8$, $R_9$, $R_{10}$, $R_{11}$, $R_{12}$, $R_{13}$, $R_{14}$ and $R_{16}$ independently represent an alkylene group of 1 to 15 carbon atoms; $R_3$ and $R_4$ independently represent an alkyl group of 1 to 10 carbon atoms; $R_6$ represents an alkyl group or alkylene group of 1 to 10 carbon atoms; $R_{15}$ represents an alkyl group of 1 to 3 carbon atoms or:

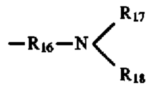

$R_{17}$ and $R_{18}$ independently represent an alkyl group of 1 to 4 carbon atoms, wherein $R_{17}$ and $R_{18}$ may form a heterocyclic ring with a nitrogen atom; and X represents a hydrogen atom or a hydroxyl group.

7. The encapsulated toner for heat-and-pressure fixing according to claims 6, wherein the amount of the monomer having one or more tertiary amine groups used is 1 to 30 mol %, based on the entire monomers.

8. The encapsulated toner for heat-and-pressure fixing according to claim 5, wherein said amorphous polyester having tertiary amine groups has a glass transition temperature of 50° C. to 80° C.

9. The encapsulated toner for heat-and-pressure fixing according to claim 5, wherein said amorphous polyester having tertiary amine groups has an amine value of 2 to 25 KOH mg/g.

* * * * *